United States Patent [19]

Daniels et al.

[11] 3,872,467

[45] Mar. 18, 1975

[54] AUTOMATIC DIALER

[75] Inventors: Leander Bruce Daniels; James W. Azbell, both of Columbus, Ohio

[73] Assignee: MI$^2$, Columbus, Ohio

[22] Filed: Mar. 21, 1973

[21] Appl. No.: 343,428

[52] U.S. Cl. .............................. 340/364, 179/90 B

[51] Int. Cl. .............................................. G08c 1/00

[58] Field of Search ....... 340/364; 179/90 B, 90 BB, 179/90 BD

[56] References Cited

UNITED STATES PATENTS

| | | | |
|---|---|---|---|
| 3,538,263 | 11/1970 | Midis et al. | 179/90 B |
| 3,549,810 | 12/1970 | Driscoll | 179/90 B |
| 3,555,201 | 1/1971 | Kuehnle et al. | 179/90 BD |
| 3,588,362 | 6/1971 | Kass | 179/90 BD |
| 3,592,974 | 7/1971 | Di Massimo | 179/90 BD |
| 3,665,113 | 5/1972 | Blake et al. | 179/90 B |
| 3,692,962 | 9/1972 | Baczynski et al. | 179/90 B |
| 3,718,771 | 2/1973 | Bank | 179/90 BD |

*Primary Examiner*—John W. Caldwell
*Assistant Examiner*—Richard P. Lange
*Attorney, Agent, or Firm*—Cennamo Kremblas & Foster

[57] ABSTRACT

An automatic dialer having rotary switches each of which is manually positionable to at least eleven alternative positions. The first ten positions correspond to a selectable digit in the dial address code and the eleventh position represents a stop dialing instruction. The positions of each switch are sequentially interrogated in turn to determine the selected address code. The interrogation logic is clocked by a pulser which simultaneously actuates dial contacts for dialing the address code.

9 Claims, 2 Drawing Figures

PATENTED MAR 18 1975 3,872,467

SHEET 1 OF 2

AUTOMATIC DIALER

BACKGROUND

This invention relates generally to a logic circuit for controlling a data terminal and more particularly relates to a circuit permitting a previously manually selected telephone number to be automtically dialed upon the depression of a start button.

Data communication equipment is often interconnected through conventional telephone networks. Connection between data terminals is accomplished through the telephone company switching equipment. For example, the operator of a local terminal may connect his terminal to a remote terminal by dialing the telephone number or address code of the remote terminal.

Individual users of data terminal equipment often find that in most or all of the communications originating from their terminal they usually seek connection with the same remote terminal. For example, regional offices may usually call the company headquarters. Consequently, each time such interconnection is desired the address code of the remote terminal must be dialed. It is therefore desirable that automatic circuitry be provided which automatically dials this most-often-used address code upon actuation by an operator at the local data terminal. Advantageously, the most often called address code is easily manually selectable. Additionally, it is desirable that the selected address code is indestructably retained after being selected unless and until a new address code is chosen. It is also desirable that the automatic dialing circuit complete its automatic dialing operation as quickly as possible after its initiation.

SUMMARY

This invention is an automatic dialer having a manually selectable dial address code. It includes a plurality of single-pole switches each having a selector with at least ten manually selectable positions. The corresponding contact positions of each switch are interconnected to form a unified output. Each switch is settable at positions corresponding to the numbers in a dial address code. A switch interrogation means is provided for sequentially applying a first selected logic level to each one of said selectors of the switches. A position interrogation means having a plurality of outputs is provided for sequentially applying a second selected logic level at each of its outputs. A clock pulser means simultaneously periodically operates a pair of dialing contacts and triggers the advance of said position interrogation means. A coincidence recognition gate is provided having a plurality of pairs of inputs, one input of each pair connected to a different one of at least nine of the unified switch outputs. The other inputs of each of said pairs is connected to a different one of the outputs of said position interrogation means. This coincidence recognition gate provides a third output logic level for triggering the advance of said switch interrogation means, for resetting said position interrogation means and for temporarily inhibiting said pulser means all in response to the coincidence of said first logic level from said switch interrogation means and a second logic level from said position interrogation means. Logic circuit means initiates operation of the pulser means prior to interrogation of the switch positions and resets said switch interrogation means after dialing is completed.

It is an object of the invention to provide an improved automatic dialer.

Another object of the invention is to provide an automatic dialer having an easily and quickly selectable address code which is also easily changeable.

Another object of the invention is to provide an automatic dialer which is fast.

Another object of the invention is to provide an electronic automatic dialer circuit having improved operating characteristics.

Further objects and features of the invention will be apparent from the following specification and claims illustrating the preferred embodiment of the invention.

Figure 1:
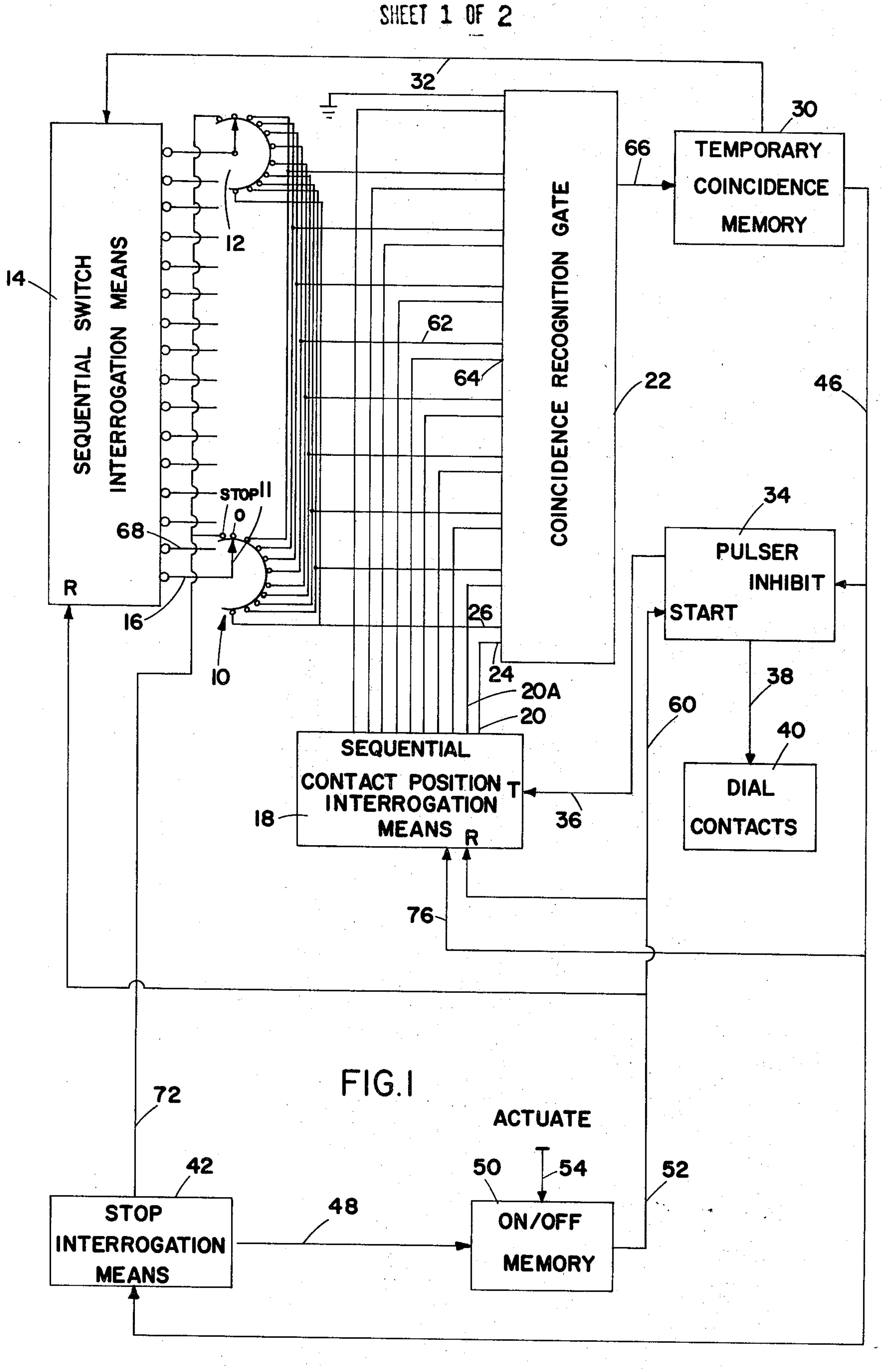
FIG. 1 is a block diagram illustrating the operation of the preferred embodiment of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the word "connection" is often used and is not to be limited to direct connection where connection through other elements would be recognized as being equivalent to those skilled in the art.

DETAILED DESCRIPTION

Referring generally to FIG. 1, the automatic dialer includes a plurality of single pole rotary switches such as 10 and 12. It should be understood that there are in reality preferably at least eleven such switches to accomodate a Bell System direct dial telephone number and advantageously more if desired. However, because the others are analogously connected, only two representative switches are illustrated.

Each of the switches has a rotatable wiper which is its selector such as the selector 11 of switch 10. The selector is settable at any one of at least eleven positions. The first nine positions of each switch correspond to the numbers 1–9. The tenth position of each switch permits selection of a zero while the eleventh position permits selection of a stop instruction. For example, the rotary switch 10 is for selecting the digit in the first position of the telephone address code. The next switch in turn selects the second digit and so on.

Generally described, the circuitry sequentially interrogates each of the switches beginning with switch 10 and in turn interrogates the intermediate switches through switch 12. The interrogation of each switch consists of the sequential interrogation of its selectable positions.

For this purpose, the sequential switch interrogation means 14 has a plurality of outputs connected to the selectors of each switch such as the output 16 connected to the selector 11 of the switch 10. The switch interrogation means 14 sequentially applies a first logic level to each one of said selectors and in this manner interrogates each switch.

During the interrogation of each switch its contacts are sequentially interrogated by a sequential position interrogation means 18 having a plurality of outputs such as output 20 for sequentially applying a second logic level at each of its outputs. The position interrogation means 18 is clocked by a pulser 34 which simultaneously drives dialing contacts 40. Thus each clock pulses corresponds to the interrogation of one switch position and simultaneously to one dial pulse.

The clock pulser 34 triggers the advance of the position interrogation means 18 through its output 36. Simultaneously, the pulser, through its output 38, actuates dial contacts 40 to actuate the telephone switching exchange and thereby dial the the desired number.

A coincidence recognition gate 22 is provided to recognize the selected digit of each switch. It has a plurality of pairs of inputs such as input pair 24. One input of each pair is connected to a different one of at least nine of the unified switch outputs; that is, one input of each pair is connected to all the corresponding positions of each switch. For example, the input 26 of input 24 is connected to all the first number 1 positions of all the switches 10 through 12.

The other input of each input pair to the coincidence recognition gate 22 is connected to a different one of the outputs of the sequential contact position interrogation means 18.

The position interrogation means 18 sequentially applies its second output level in turn to each of the input pairs of the coincidence recognition gate 22. A position corresponding to a selected digit of the telephone number is recognized when the recognition gate 22 receives a coincidence at one of its input pairs of the second logic level from the position interrogation means 18 and the first logic level from the output of the sequential switch interrogation means 14 which is applied through the switch selector and contacts.

When the coincidence recognition gate 22 recognizes such a coincidence, its output operates to reset the position interrogation means 18 and stops and temporarily prevents further dialing.

More specifically, the output of the coincidence recognition gate is applied to a temporary coincidence memory 30 which stores for a selected time interval a logic level shift which indicates that a coincidence has been recognized. Through an output 32 of the temporary coincidence memory 30 the sequential switch interrogation means 14 is advanced to the next switch.

The eleventh or stop positions of each rotary switch, such as the switch 10, are all interconnected to a unified output and connected to a stop interrogation means 42. The stop interrogation means 42 determines after advance of the switch interrogation means 14 to the subsequent switch whether or not the subsequent switch is positioned at a stop position. This is determined before interrogation of the switch contacts by the position interrogation means 18. Such stop interrogation is initiated by the output 46 of the temporary coincidence memory 30 which additionally inhibits further operation of the clock pulser 34.

If a stop position is recognized, the stop interrogation means 42 through its output 48 instructs an on/off memory 50 to switch the automatic dialer to an off state.

The on/off memory 50 may, for example, be a flip/-flop and is actuated to an on state through the actuate switch button illustrated as 54. It is switched to an off state by the stop interrogation means 42. The output 52 of the on/off memory 50 resets the position interrogation means 18 and resets the switch interrogation means 14. The position interrogation means 18 is reset when the on/off memory 50 switches to an "off" state and the switch interrogation means is reset after dialing is completed when the on/off memory 50 switches to its "off" state. Additionally, when switched from an off to an on state the on/off memory 50 initiates and enables further operation of the clock pulser 34. When in an off state, operation of the clock pulser 34 is inhibited.

Operation of the simplified circuit illustrated in FIG. 1 would begin with manual selection of the address code by positioning each of the rotary switches 10 through 12 at a position corresponding to the required digit for each position in the address code. The next subsequent switch after the numbers of the address code is positioned to its stop position otherwise continued erroneous dialing would occur. Once such address code is selected it may be retained to thereby permit all further dialing of that number to be accomplished without resetting of the address code. The automatic dialing operation is initiated by depressing the actuate button 54 to flip the on/off memory 50 to its "on" state. This causes a shift in the output 52 of the on/off memory 50 which resets the position interrogation means 18 and further enables operation of and starts the clock pulser 34 through its input 60.

The pulser 34 begins providing output clock pulses simultaneously at its output 36 and its output 38. The pulses at output 38 actuate the dial contacts and begin dialing the selected address code. The pulses at the output 36 trigger the sequential operation of the position interrogation means 18. In this manner, the first trigger pulse causes a selected output logic level to be first applied only to the output 20 of the position interrogation means 18. The next trigger pulse applies the selected output logic level only to the next output 20A and so on. In this manner, the selected output logic levels and in turn applied sequentially to each of the input pairs of the coincidence recognition gate 22. The contacts of the switch are thereby interrogated.

This sequential switching and pulsing continues until a coincidence is recognized by the coincidence recognition gate 22. For example, if the switch 10 were positioned at the position 6, then, after 6 pulses, the output level at the output 16 of the sequential switch interrogation means 14 would be applied through the rotary switch 10 to the input 62 of the 6th input pair 64 of the coincidence recognition gate 22.

This would produce a level shift at the output 66 of the recognition gate 22 which would switch the temporary coincidence memory 30 to its temporary state. The temporary coincidence memory 30 may for example, be a one shot. The output 32 of the coincidence memory 30 will trigger the advance of the switch interrogation means 14 to apply its selected first logic level to the next rotary switch. The selected first level will then, for example, be applied through the output 68 of the switch interrogation means 14. Simultaneously, the output 46 of the temporary coincidence memory 30 will inhibit the pulser 34 from providing further pulses and therefore prevents further operation of the dial contacts 40.

The dial contacts 40 which operated simultaneously with the first six clock pulser pulses will have been opened 6 times if the first rotary switch 10 is positioned at position 6. Additionally, the output 46 of the temporary coincidence memory 30 will apply an interrogation pulse to the stop interrogation means 42. If the next rotary switch connected to the output 68 of the sequential switch interrogation means 14 is positioned at its stop position, then the logic level at the output 68 will be applied through this next switch to the input 72 of the stop interrogation means to indicate such position. Such positioning would switch the on/off memory to its off state and prevent further dialing.

Most likely of course, several digits must be dialed before a stop position will be detected. Consequently, if a stop position is not detected at the second rotary switch connected to the output 68, the on/off memory 50 will not be switched to an off state and the pulser 34 may again begin operating when the output 46 of the coincidence memory 30 returns to its stable state.

The return of the temporary coincidence memory 30 to its stable state not only permits continued operation of the pulser 34 but additionally resets the position interrogation means 18 through its reset input 76. The pulser 34 then begins pulsing and continuously repeats the above operation until a stop position is indicated on one of the switches 10 through 12.

Figure 2:
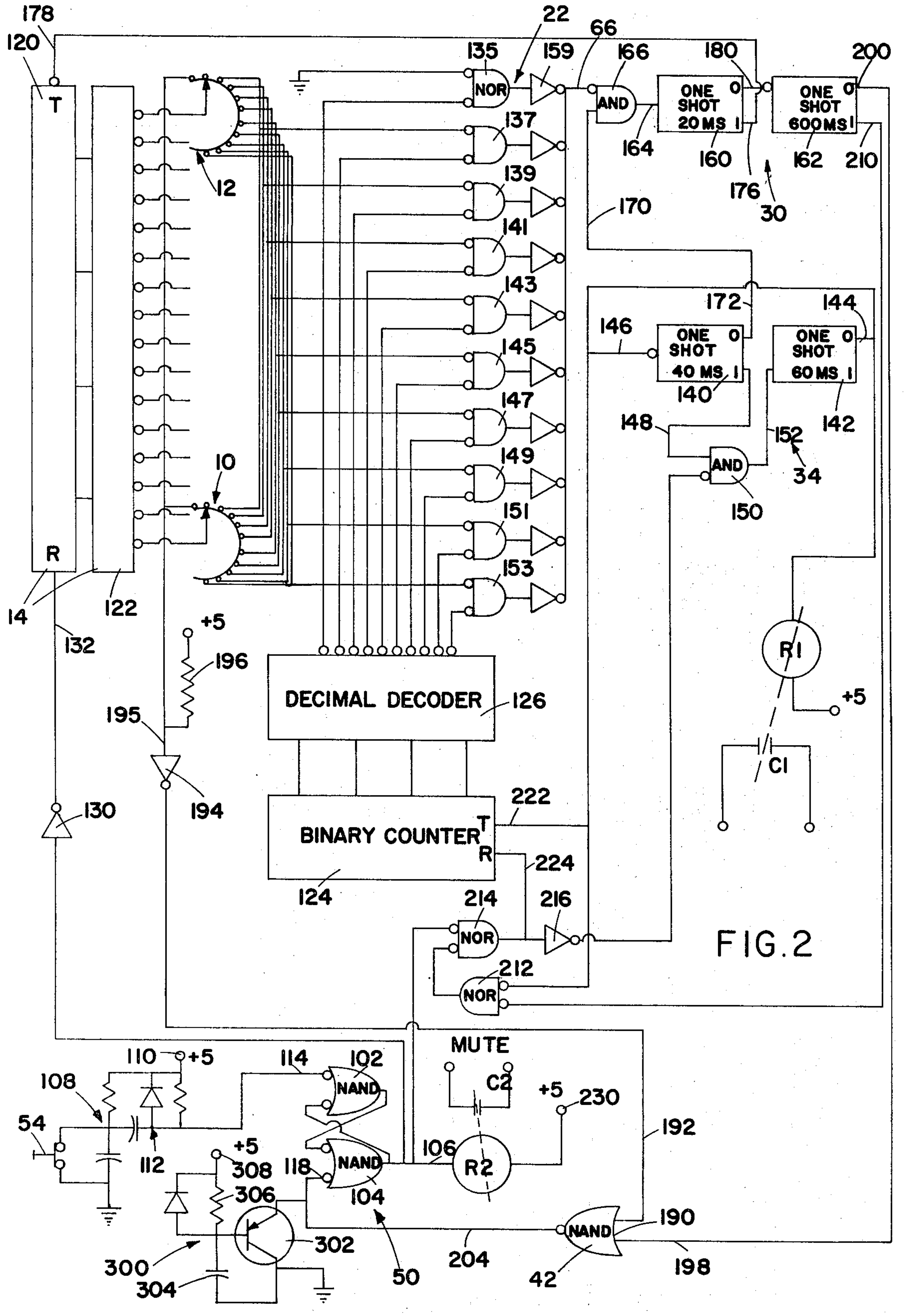
FIG. 2 is a schematic and logic diagram of the preferred embodiment of the invention.

We refer now to a consideration of the preferred embodiment of the invention illustrated in more detail in FIG. 2. The circuit of FIG. 2 is a five volt circuit in which a plus five volt level represents a logical one and a zero volt level represents a logical zero. In the circuit of FIG. 2, the preferred on/off memory 50 comprises a nand-gate flip/flop having nand-gates 102 and 104. A zero volt level at the output 106 of the flip-flop represents a start or "on" instruction while a five volt (logical one) level represents a stop or "off" instruction. The on/off memory 50 is switched to an "on" state by depressing the actuating button 54, which is connected to a power supply 110 and, through a differentiating circuit 112 to the input 114 of nand-gate 102. Depression of the actuating button 54 applies a spike to nand-gate 102 to switch the on/off memory 50 to an "on" state. The on/off memory 50 is switched to a stop or off state by application of a zero volt level (logical zero) at the input 118 of the nand-gate 104.

Each of the interrogation means comprises a binary counter and an associated decimal decoder. The switch interrogation means 14 includes binary counter 120 and associated decimal decoder 122 while the position interrogation means comprises binary counter 124 and its decimal decoder 126. Such decoders provide at their outputs a sequentially shifted zero volt level (logical zero) at one output while maintaining outputs at a +5 volts (logical one) level at all other ouputs.

The output 106 of the on/off memory 50 is connected through an inverter 130 to the reset input 132 of the binary counter 120.

The preferred coincidence recognition gate 22 comprises a plurality of nor gates 5 through 3 having their outputs applied to inverters such as an inverter 159. The two inputs to each nor gate 135 through 153 provide the pairs of inputs described above. Thus, one input of each nor gate 135 through 153 is connected to an output of the decimal decoder 126. The other inputs of these nor gates are connected to each of the interconnected, unified, corresponding positions of the rotary switches 10 through 12.

The preferred clock pulser 34 comprises a pair of one shots 140 and 142 connected to operate as an unsymmetrical, astable multivibrator. Thus the output 144 of one shot 142 is connected back to the input 146 of one shot 140. Similarly, the output 148 of one shot 140 is connected through AND gate 150 to the input 152 of one shot 142. As will be seen, the AND gate 150 enables and disables the oscillation of these two one shots 140 and 142 connected as a multivibrator. The one shots 140 and 142 have different time delays corresponding to the desired open and close times for dialing contacts. The one shot 142 has its output 144 connected to the energization coil $R_1$ of a dialing relay which actuates dialing contacts $C_1$. This one shot 142 has a 60 millisecond time delay to maintain the dialing contacts $C_1$ in an open condition for 60 milliseconds.

The one shot 140 desirably has a 40 millisecond time delay so that the time between dialing pulses when the contacts $C_1$ are closed is 40 milliseconds.

The outputs of the one shots in the circuit of FIG. 2 are illustrated with logical zeros and logical ones showing their state when the one shot is not actuated.

The temporary coincidence memory 30 comprises a pair of one shots 160 and 162. The one shot 160 has a 20 millisecond time interval and is connected at its input 164 through an AND gate 166 to the output 66 of the coincidence recognition gate 22. The AND gate 166 has an input 170 connected to the output 172 of the one shot 140 and an inverting input connected to the output 66 of the recognition gate 22. The one shot 160 will be actuated when a coincidence is recognized and when the one shot 140 is actuated so that the temporary coincidence memory means will be initially actuated only when the dialing contacts are in their closed condition.

The one shot 160 has a 20 millisecond time delay and has its output 176 connected to the trigger input 178 for advancing the binary counter 120. The time delay of one shot 160 gives the binary counter 20 milliseconds in which to complete its switching transition.

The other output 180 of the one shot 160 is connected to a 600 millisecond one shot 162. This 600 millisecond time delay assures a 600 millisecond time interval between the dialing pulses for each digit.

The stop interrogation means 42 comprises a nand-gate 190 having its input 192 connected to an inverter 194 the input of which is releasably clamped by resistor 196 to a +5 volt level. The input 195 of the inverter 194 is also connected to the stop position of the switches 10 through 12. The other input 198 of the nand-gate 190 is connected to the output 200 of the one shot 162. Thus, whenever, a logical zero is applied from the output of decimal decoder 122 through the inverter 194 to the input 192 of the nand-gate 190 and the 600 millisecond one shot 162 is in its timing interval, then the output 204 of the nand-gate 190 will switch to a logical zero which switches the on/off memory 50 to its "stop" state.

The other output 210 from one shot 162 is applied to a logic circuit comprising nor gate 212, nor gate 214 and inverter 216. The inputs of nor gate 214 are connected to the output 106 of the on/off memory 50 and to the output of nor gate 212. The inputs to nor gate 212 are connected to the output 210 of one shot 162 and to the interconnected output 144 of one shot 142 and the input 146 of one shot 140. This interconnected input and output is also connected to the trigger input 222 of binary counter 124. Additionally, the output of nor gate 214 is connected to the reset input 224 of binary counter 124.

To provide a muting function, as desired in conventional telephone dialing, the muting relay $R_2$ is connected between a +5 volt power supply 230 and the output 106 of the on/off memory 50. Its muting contacts are conventionally connected to the telephone system.

As an additional feature of the circuitry illustrated in FIG. 2, a temporary clamping circuit 300 is connected to the on/off memory means 50 to assure that the on/-off memory means 50 always comes up in a stop state when power is initially applied to the automatic dialer. For this purpose, a transistor 302 is connected between the input 118 of nand-gate 104 and ground and is provided with an input biasing circuit including capacitance 304 and resistance 306 connected to a power supply 308. When power is initially applied, the capacitance 304 is discharged and the transistor 302 is initially switched into conduction to connect the input 118 of nand-gate 104 to ground and thus to a logical zero. This switches the on/off memory 50 to a stop output condition. After the capacitor charges sufficiently to cut off the transistor 302 after a suitable time delay, the transistor 302 is effectively disconnected from the logic circuit.

The operation of the circuit in FIG. 2 is basically like that of the circuit illustrated in FIG. 1. It begins identically in the same manner by positioning the rotary switches 10 through 12 in their desired positions corresponding to the address code desired. A depression of the button 54 applies a spike to the nand-gate 102 to switch the output 106 of the flip/flop connected nand-gates 102 and 104 to a logical zero or zero volt output state. This applies energy to the mute relay $R_2$ to hold the mute contacts closed during dialing i.e., when the on/off memory is in a start state. Simultaneously, the logical zero at the output 106 of the on/off memory 50 is gated through nor gate 214 to reset the binary counter 124 at its reset input 224. This level shift is also gated through the inverter 216 and applied to the AND gate 150. In response, the output of the AND gate 150 will shift to a logical one level and thereby initiate operation of one shot 142.

Operation of one shot 142 will open the dialing contacts $C_1$ for 60 milliseconds and then actuates one shot 140 through its input 146. So long as the output of nor gate 214 remains at its one state the one shot 140 will trigger the one shot 142 through AND gate 150 and therefore the one shot 140 and 142 will continue operating as an astable multivibrator. Each operation of one shot 142 opens the dialing contacts $C_1$ one time.

The occurrence of the simultaneous coincidence of a zero state at both inputs to one of the nor gates 135 through 153 of the coincidence recognition gate 22 will cause a logical zero to appear at output 66 of the recognition means 22. AND gate 166 can now initiate operation of one shot 160 which in turn both advances binary counter 120 and initiates operation of one shot 162. Operation of one shot 162 will provide a logical one level at its output 200 which of a logical one is also present at the input 192 to nand-gate 190 will switch the on/off memory 50 to a stop state. Otherwise, if a logical zero is present at the input 192 of the nand-gate 190, the output 204 of nand-gate 190 will remain in the logical one state and having no effect on the on/off memory 50.

Simultaneously, operation of one shot 162 will through its output 210, apply a logical zero to nor gate 212 so that as soon as one shot 140 is actuated a logical one appears at the output of nor gate 212 to provide a logical zero at the output of nor gate 214. This in turn will disable one shot 142 by preventing gating of pulses through AND gate 150 from one shot 140. Consequently, the one shots 140 and 142 will be prevented from oscillating and providing pulses while one shot 162 is actuated.

After one shot 162 has timed out, it shifts its ouputs to allow the output of nor gate 214 to return to a logical one state. This resets binary counter 124 and again enables one shots 140 and 142 to operate.

The position interrogation will now commence for the next rotary switch until coincidence is again recognized. The entire sequence will continuously be repeated until a stop position is recognized 20 milliseconds after the advance of binary counter 120. The recognition of a stop position will apply a logical one to the input 192 of the nand-gate 190 which will cause the on/off memory to switch to its off state.

Therefore, it can be seen that the ease and convenience of manually positioning rotary switches 10 through 12 permits an easily changeable but indestructable memory of particular selected address code. Additionally, the fact that the clock pulser 34 simultaneously dials and interrogates permits the faster completion of the automatic dialing operation.

It is to be understood that while the detailed drawings and specific examples given describe a preferred embodiment of the invention, they are for the purpose of illustration only, that the apparatus of the invention is not limited to the precise details and conditions disclosed and that various changes may be made therein without departing from the spirit of the invention which is defined by the following claims.

What is claimed is:

1. An automatic dialer having a manually selectable dial address code and comprising:

a. A plurality of single pole switches each having a selector with at least ten manually selectable positions, the corresponding positions of each switch being interconnected to form a unified output, each switch settable at positions corresponding to the numbers in the dial address code;

b. a switch interrogation means for sequentially applying a first selected logic level to each one of said selectors;

c. a position interrogation means having a plurality of outputs for sequentially applying a second selected logic level at each of its outputs;

d. a pair of dialing contacts, and pulser clock means for simultaneously periodically operating said pair of dialing contacts and triggering the advance of said position interrogation means;

e. a coincidence recognition gate having a plurality of pairs of inputs, one input of each pair connected to a different one of at least nine of said unified switch output and the other inputs of each pair connected to a different one of the output of said position interrogation means said recognition gate providing a third output logic level for triggering the advance of said switch interrogation means, for resetting said position interrogation means and for temporarily inhibiting said pulser means all in response to the coincidence of said first logic level from said switch interrogation means and a second logic level from said position interrogation means; and f. logic circuit means for initiating operation of said pulser prior to interrogation of the switch positions and for resetting said switch interrogation means after dialing is completed, including 1. an on/off memory means including a flip-flop having a first state corresponding to a stop dialing instruction and a second state corresponding to a start dialing instruction, its output being connected for resetting said switch interrogation means in response to a stop state;
2. digital logic gates having inputs connected to said on/off memory means, said temporary coincidence memory, and said pulser and an output connected to the reset of said position interrogation means and to said enabling gate for preventing reset of said position interrogation means when said on/off memory means is in a stop state, for resetting said position interrogation means when simultaneously said on/off memory is in its start state said temporary coincidence memory is actuated and said dialer contacts are closed and for resetting said position interrogation means when said on/off memory switches from a stop state to a start state.

2. An automatic dialer according to claim 1 wherein each of said switches comprises a rotary switch each having its wiper arm as said selector connected to an output of said switch interrogation means.

3. An automatic dialer according to claim 1 wherein a temporary coincidence memory is connected at the output of said coincidence recognition gate for shifting to a selected logic level for a selected time interval in response to the occurrence of said third logic level at the output of said coincidence recognition gate.

4. An automatic dialer according to claim 1 wherein said temporary memory comprises a pair of one shots, one having an output connected for advancing the switch interrogation means and being actuated for a sufficient time to assure advance thereof and the other connected for inhibiting said pulser and resetting said position interrogation means and being actuated for providing a desired time interval between digits of said dial address code.

5. An automatic dialer according to claim 1 wherein said pulser comprises an unsymmetrical, astable multivibrator having an enabling/disabling gate input.

6. An automatic dialer according to claim 1 wherein a stop interrogation means is provided comprising:

a. an eleventh position on each of said switches, each of said eleventh positions being interconnected to form a unified output; and b. logic gate means having an output connected to an input of said on/off memory means for switching said on/off memory means to a stop state in response to the coincidence of said first selected logic level from said switch interrogation means at a unified output of said eleventh position and actuation of said temporary memory means.

7. An automatic dialer according to claim 6 wherein the energization coil of a mute contact relay is connected to the output of said on/off memory means for closing said contacts in response to said start state.

8. An automatic dialer according to claim 7 wherein a temporary clamping circuit is connected to said on/-off memory means to assure that said on/off memory means always initially is in a stop state when power is initially applied to said automatic dialer, said temporary clamping circuit comprising a transistor connecting a set to stop input of said on/off memory means to an appropriate voltage level for setting said on/off memory means to a stop state and an input biasing circuit including a capacitance and resistance for initially bringing said transistor into conduction and for cutting off said transistor when said capacitor charges.

9. An automatic dialer according to claim 8 wherein said temporary memory comprises a pair of one shots, one having an output connected for advancing the switch interrogation means and being actuated for a sufficient time to assure advance thereof and the other connected for inhibiting said pulser and resetting said position interrogation means and being actuated for providing a desired time interval between digits of said dial address code.

* * * * *